(12) United States Patent
Goodwin et al.

(10) Patent No.: US 8,776,031 B1
(45) Date of Patent: Jul. 8, 2014

(54) MANIPULATING RESOURCES EMBEDDED IN A DYNAMIC-LINK LIBRARY

(75) Inventors: Michael Christopher Frances Goodwin, Ackworth, GA (US); Andrew Michael Krock, Cummings, GA (US)

(73) Assignee: Noble Systems Corporation, Atlanta, GA (US)

( * ) Notice: Subject to any disclaimer, the term of this patent is extended or adjusted under 35 U.S.C. 154(b) by 57 days.

(21) Appl. No.: 13/570,533

(22) Filed: Aug. 9, 2012

(51) Int. Cl.
*G06F 9/45* (2006.01)
*H04L 9/32* (2006.01)
*G06F 17/28* (2006.01)

(52) U.S. Cl.
USPC ........... 717/139; 717/144; 717/148; 713/190; 704/2

(58) Field of Classification Search
None
See application file for complete search history.

(56) References Cited

U.S. PATENT DOCUMENTS

| | | |
|---|---|---|
| 7,152,221 B2 | 12/2006 | Andrew et al. |
| 8,078,612 B2 | 12/2011 | Francker et al. |
| 2001/0008023 A1* | 7/2001 | Bond et al. ................... 717/148 |
| 2002/0100028 A1* | 7/2002 | Kosaka et al. ................ 717/139 |
| 2002/0138748 A1* | 9/2002 | Hung ............................ 713/190 |
| 2003/0200535 A1* | 10/2003 | McNamara ................... 717/137 |
| 2004/0111716 A1* | 6/2004 | Kleyer ........................... 717/148 |
| 2007/0027670 A1* | 2/2007 | Verhey-Henke et al. ......... 704/2 |
| 2011/0093837 A1* | 4/2011 | Guenthner et al. ........... 717/149 |
| 2012/0005661 A1* | 1/2012 | Johnston et al. .............. 717/148 |

OTHER PUBLICATIONS

Linkers and Loaders, John R. Levine, Morgan Kaufmann 1999.
"Resources & Desktop Apps," http://msdn.microsoft.com/en-us/vstudio/f45fce5x(v=vs.95).aspx.

* cited by examiner

*Primary Examiner* — Don Wong
*Assistant Examiner* — Mohammad Kabir

(57) ABSTRACT

Embodiments of the present invention provide computer program products, methods, and systems for extracting and revising data for a resource embedded in a dynamic-link library (DLL) assembly. In various embodiments, the DLL assembly is loaded and data for a resource is extracted from the assembly. In particular embodiments, a manifest is created that includes a path for the extracted data extracted. This path includes information on placing the data for the resource into the assembly to construct a necessary DLL structure compatible with the program application. After the extracted data has been edited to create replacement data, in various embodiments, the replacement data is imported into the assembly based on the path for the extracted data and the assembly is compiled to create a revised DLL that may be read by the program application in place of or in addition to the original DLL assembly to utilize the replacement data.

25 Claims, 5 Drawing Sheets

MANIPULATING RESOURCES EMBEDDED IN A DYNAMIC-LINK LIBRARY

BACKGROUND

In today's world, many software applications (e.g., programs) are constructed so that such applications may be portable from systems and/or machines to other systems and/or machines and may run (e.g., execute) on such systems and/or machines independent of their source (e.g., developers). For example, many software providers, such as Microsoft®, develop software applications (e.g., Word®) that may be purchased from these providers and installed on individual systems and/or machines for use.

Typically, these software applications include source code that is organized in several modules that are linked to form an executable program. In addition, these software applications may include resource data that is utilized by the software applications during runtime. As a result, the development of these software applications generally requires generation of several different file types that cooperate to provide the functionality of a particular software application.

A popular method utilized in a Windows® environment is a combination of modules such as dynamic-link library (DLL) files, resource files, library files, and other file types that are used to generate a software application. As a result, in particular instances, a software application may depend on a large number of files to handle different functionality during the course of execution. Typically, these files are compiled individually and linked during the "development" stage to form the application. That is, in many instances, these files are compiled to generate binaries that are integrated into the application and the shipped software application is an integrated package of a number of different compiled binary files.

With respect to DLL files, when an application uses a routine in a particular DLL file, the operating system of the system or machine the application is installed on loads the DLL file into memory, resolves references to the functions available in the particular DLL file so that they can be called by the application, and unloads the DLL file once the functions are no longer needed by the application. Thus, individual DLL files are only loaded as needed and do not tie up resources when they are not needed. Such a configuration is commonly referred to as dynamic linking.

While DLL files are typically composed of executable code (e.g., functions), in many instances, data is also embedded in DLL files for use by the application. For instance, many applications make use of data, such as graphics, parameters, bitmaps, icons, strings, and the like for rendering of graphical elements on a screen. Although such data may be provided in independent forms such as external files or databases, many times such data is packaged (e.g., embedded) into a DLL for ease of providing the data along with the application (e.g., deployment) and/or for security so that a user of the application cannot easily alter, replace, or corrupt the data.

In some instances, such data may need to be modified or expanded. For example, an application is typically developed with a default language. For instance, an application may be developed with a default language of English in a United States locale. However, if the application is being marketed to a country with a different language than the default language for the application, say French, the text and appearance of the controls used on various user interfaces may need to be modified to reflect the new language. For example, the controls for Microsoft® Word® would need to be changed from English to French before the application can be readily sold in French speaking areas.

In many instances, the data for these controls are embedded in a default resource (e.g., DLL) and the typical method for providing the data for these controls in French is to have the developer provide a satellite resource (e.g., satellite DLL) specifically for French that may be utilized by the application at runtime instead of the default resource. This can be a time-consuming process and can lead to frustrated potential customers who may wish to purchase the application in their native language. Thus, a need in the art exists to be able to extract embedded resources from a DLL, edit those resources, and re-compile the DLL with the edited resources without having to involve the developer. It is with respect to this consideration and others that the disclosure herein is presented.

BRIEF SUMMARY

In general, embodiments of the present invention provide computer program products, methods, systems, apparatus, and computing entities for extracting and revising data for a resource embedded in an original dynamic-link library (DLL) assembly associated with a program application. Various embodiments involve the process of loading the original DLL assembly associated with the program application. In particular embodiments, the original DLL assembly comprises a necessary DLL structure compatible with the program application.

In addition, in particular embodiments, the process involves extracting data for a resource from the original DLL assembly, storing the extracted data in memory, and creating a manifest that includes a path for the data for the resource extracted from the original DLL assembly. In these particular embodiments, the memory may comprise at least one of a file, a database, random access memory, or combination thereof. In addition, in these particular embodiments, the path includes information on placing the data for the resource into the original DLL assembly to construct the necessary DLL structure compatible with the program application. Further, in particular embodiments, the process involves editing the data to create replacement data.

According to various embodiments, after creating the replacement data, the process continues with importing the replacement data into the original DLL assembly based on the path for the data for the resource in the manifest and compiling the assembly to create a revised DLL assembly. In particular embodiments, the revised DLL assembly includes the replacement data for the resource and the revised DLL assembly is read by the program application in place of or in addition to the original DLL assembly at runtime without having to rebuild the program application. Further, the replacement data is utilized by the program application in place of or in addition to the original data for the resource.

In various embodiments, the manifest further includes an original assembly name for the original DLL assembly. For these particular embodiments, the process of compiling the assembly involves creating the revised DLL assembly by using the original assembly name from the manifest. Further, in particular embodiments, the data from the resource includes one or more strings in a first language and the process for editing the data comprises providing a translation in a second language for each of the one or more strings in a first language to create the replacement data. In other embodiments, the data from the resource includes one or more graphics and the process for editing the data comprises editing a graphic of the one or more graphics to create the replacement data.

Further, embodiments of the present invention also provide computer program products, methods, systems, apparatus, and computing entities for providing a replacement term for a program application. In particular, various embodiments involve loading an original dynamic-link library (DLL) assembly associated with the program application. In particular embodiments, the original DLL assembly comprises a necessary DLL structure compatible with the program application.

In various embodiments, the process involves determining an original resource embedded in the original DLL assembly, the original resource comprising data with an original term. In particular embodiments, the process further involves extracting the data with the original term from the original DLL assembly, storing the data with the original term in memory, and creating a manifest that includes an original assembly name for the original DLL assembly and a path for the data with the original term extracted from the original DLL assembly, the path comprising information on placing the data with the original term into the original DLL assembly to construct the necessary DLL structure compatible with the program application. In addition, in particular embodiments, the process involves editing the data with the original term to create data with the replacement term.

For particular embodiments, the process further involves importing the data with the replacement term into the original DLL assembly based on the path for the data with the original term in the manifest and compiling the assembly to create a satellite DLL assembly using the original assembly name from the manifest. For these particular embodiments, the satellite DLL assembly is read by the program application in place of or in addition to the original DLL assembly at runtime without having to rebuild the program application and the program application utilizes the replacement term in place of the original term.

The subject matter disclosed herein may be implemented as a computer-controlled apparatus, a method, a computing system, or as an article of manufacture such as a computer-readable storage medium. These and various other features will be apparent from the following detailed description and the associated drawings.

This summary is provided to exemplify concepts at a high level form that are further described below in the detailed description section. The summary is not intended to identify key or essential features of the claimed subject matter, nor is it intended to be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
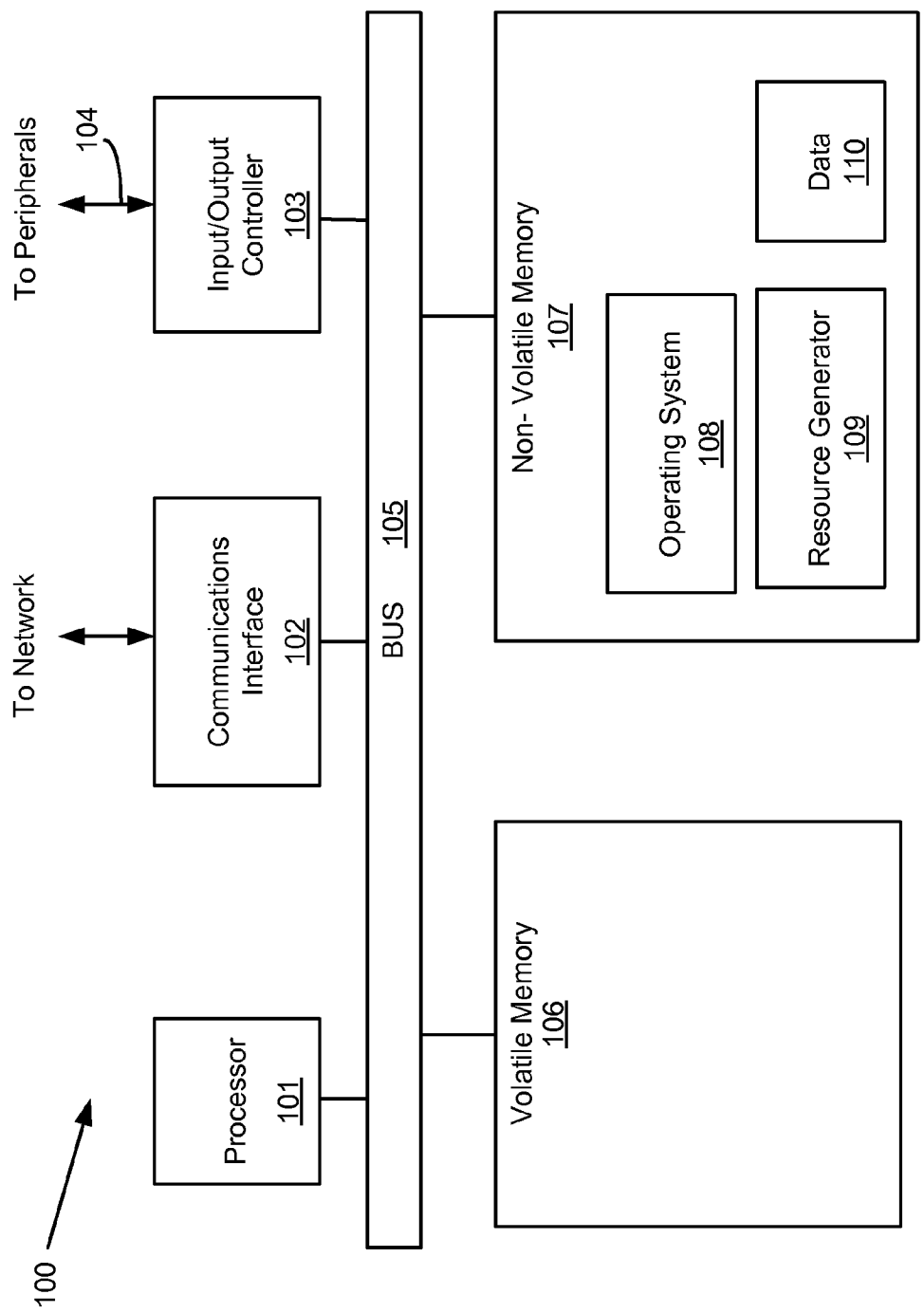
FIG. 1 is an exemplary schematic diagram of a server used in one embodiment to practice the inventive aspects disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Server Component

As will be discussed in further detail, various aspects of the current invention may be implemented as purely hardware components, software components running on one or more computing devices, or a combination of both. With this in mind, in various embodiments, the invention may take the form of one or more software applications running on a computing device such as a server. FIG. 1 is an exemplary schematic diagram of a processing system 100 that may be used in embodiments to practice the technologies disclosed herein. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 1, the processing system 100 may include one or more processors 101 that may communicate with other elements within the processing system 100 via a bus 105. The processor 101 may be implemented as one or more complex programmable logic devices ("CPLDs"), microprocessors, multi-core processors, digital signal processors ("DSPs"), system-on-a-chip ("SOCs"), co-processing entities, application-specific integrated circuits ("ASICs"), field programmable gate arrays ("FPGAs"), programmable logic arrays ("PLAs"), hardware accelerators, other circuitry, or the like.

In one embodiment, the processing system 100 may also include one or more communications interfaces 102 for communicating data via network(s) with various devices. Depending on the embodiment, communication may be via wired, optical, or wireless network(s) (or a combination thereof). The communication may use a variety of data transmission protocols, such as fiber distributed data interface (FDDI), Ethernet, asynchronous transfer mode ("ATM"), or frame relay.

The input/output controller 103 may also communicate with one or more input devices or peripherals using an interface 104, such as, but not limited to: a keyboard, a mouse, a touch screen/display input, microphone, pointing device, etc. The input/output controller 103 may also communicate with output devices or peripherals, such as displays, printers, speakers, headsets, banner displays, etc.

The processor 101 may be configured to execute instructions stored in volatile memory 106, non-volatile memory 107, or other forms of computer-readable storage media accessible to the processor 101. The volatile memory 106 may comprise various types of memory technologies, including, but not limited to: random access memory ("RAM"), dynamic random access memory ("DRAM"), static random access memory ("SRAM"), and other forms well known to those skilled in the art. The non-volatile memory 107 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 107 may store program code and data, which also may be loaded into the volatile memory 106 at execution time. Specifically, the non-volatile memory 107 may store one or more program modules and/or operating system code 108 containing instructions for performing the process and/or functions associated with the technologies disclosed herein. For example, the program modules may comprises a resource generator 109 as will be discussed in greater detail below. The resource generator 109 may also access, generate, or store data 110 in the non-volatile memory 107, as well as in the volatile memory 106. Further, the resource generator 109 may be implemented as one module or as other groupings.

The volatile memory 106 and/or non-volatile memory 107 may be used to store other information including, but not limited to: records, applications, programs, scripts, source code, object code, byte code, compiled code, interpreted code, machine code, executable instructions, or the like. These may be executed or processed by, for example, the processor 101. These may form a part of, or may interact with, the resource generator module 109.

The technologies described herein may be implemented in various ways, including as computer program products comprising memory storing instructions causing a processor to perform the operations associated with the above technologies. The computer program products may comprise a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer-readable storage media include all the above identified computer-readable media (including volatile and non-volatile media), but does not include a transitory, propagating signal. Non-volatile computer-readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Resource Generator Module

Figure 2:
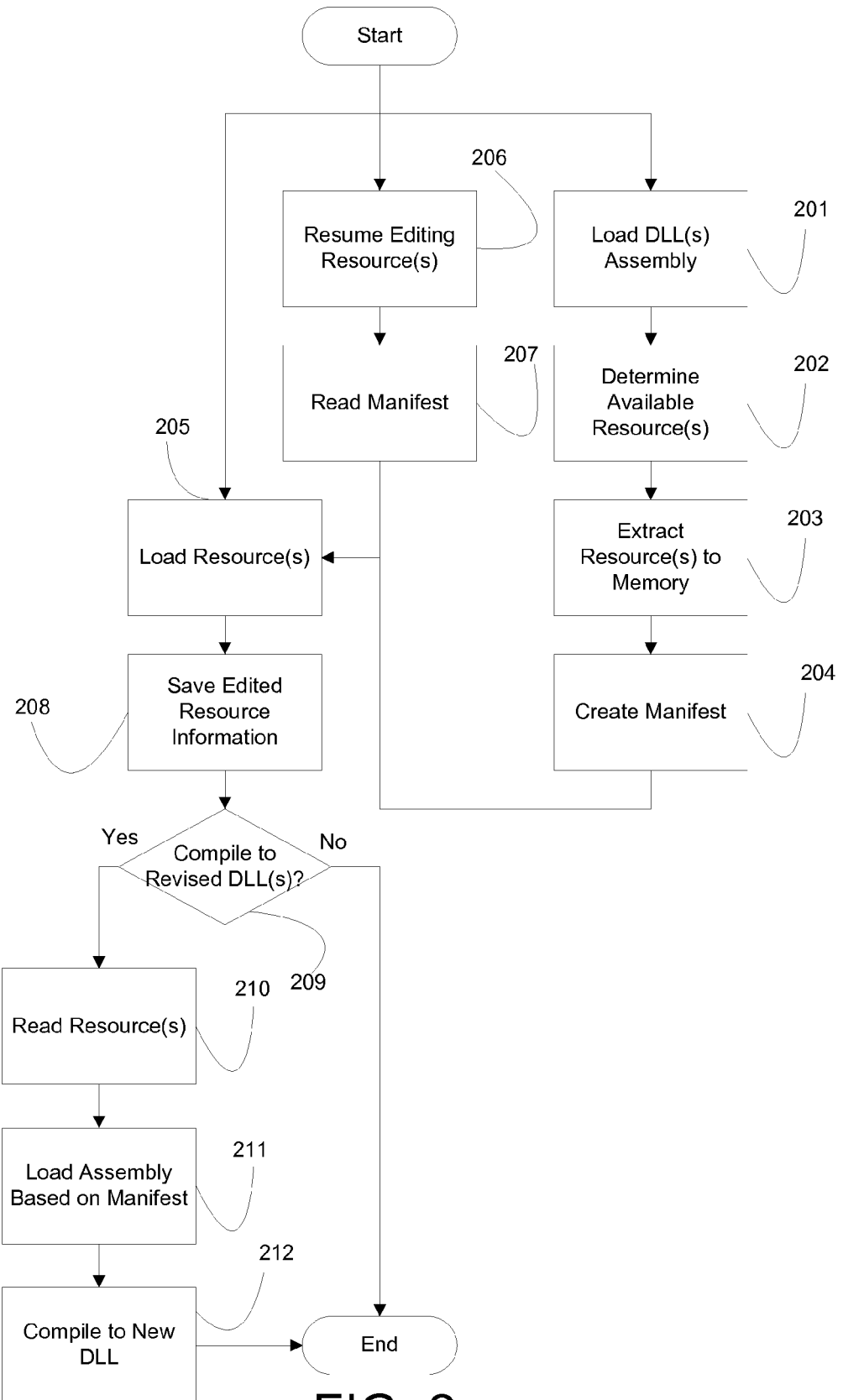
FIG. 2 is a flowchart illustrating a resource generator module used in accordance with an embodiment of the present invention.

Turning now to FIG. 2, additional details will be provided regarding the process flow for generating new/edited resources for a particular DLL. In particular, FIG. 2 is a flow diagram showing a resource generator module 109 for performing such functionality according to one embodiment of the invention. For example, the flow diagram shown in FIG. 2 may correspond to steps carried out by the processor 101 in the computing system 100 shown in FIG. 1, as it executes the resource generator module 109 stored in the computing device's volatile 106 and/or nonvolatile memory 107. In various embodiments, to facilitate the extracting and editing of resources from a DLL, a user is provided with an editor interface in communication with the resource generator module 109. The editor interface may comprise one or more screens from which the user may extract, edit, and recompile resources embedded in a particular DLL.

An example is given to help with the explanation of the resource generator module 109. However, one of ordinary skill in the art should understand that the example is only provided to help facilitate the discussion of the resource generator module 109 and should not be construed to limit the scope of the invention. In this example, a software application that supports English (e.g. has a default language of English in a United States locale) was previously purchased by a customer. The customer would now like to extend the use of the application to a facility in France and plans to purchase the needed licenses. However, as mentioned, the application currently only supports English and not French. Normally, to provide a version of the application in French, the developer of the software application would need to develop such a version and send it to the customer. This can be time consuming and expensive.

For this particular example, the text and controls for the application are not hard coded in English. Instead, each text equivalent (e.g., term or phrase) and/or control is stored in a resource file along with an associated key so that the application can look up the text equivalent in the resource file for use with the application. Further, the framework assembly for the application is configured to contain one or more resource files specific to a given language. These resource files are known as satellite assemblies that are loaded into memory only if a user elects to view the application in the corresponding language. For instance, if the user elects to view the application in French, the corresponding satellite resource file(s) are loaded into memory for the application at runtime. If for some reason the application cannot find the proper satellite resource file(s) to load into memory at runtime, the application loads the default language resource file(s) into memory instead. Such a structure is commonly referred to as the hub and spoke model. The model requires the satellite resources to be placed in specific locations so that the application can easily locate these resources for use when needed.

As previously mentioned, typically the developer of the application would provide the various satellite resources needed to support different languages. However, in this instance, the developer instead provides the editor interface and underlying resource generator module 109 to allow the customer to extract one or more resources from DLLs that support the software application and edit the resources to provide the necessary satellite assemblies needed to support the interfaces associated with the software application in French. As a result, the software application is revised by the customer without having to have the developer develop and provide a new version of the application with French interfaces to the customer.

Initially, the customer installs the resource generator module 109 on a computer system (e.g., the system 100 described in FIG. 1) and launches the module 109. As a result, the customer is provided with a first user interface. For this particular example, the customer is instructed to go to the directory where the software application is installed. Depending on the embodiment, this directory may be on the same computer system the customer is working on or may be located on a different computer system that is accessed over a network. Once the customer has opened the directory in which the software application is installed, the customer is instructed in particular embodiments to copy one or more DLL files to a separate directory. For instance, in one embodiment, the customer may be instructed to copy the LanguageBuilder.dll and the CulturalSupport.dll to a new directory created on the customer's computer system. For these particular embodiments, this step may be carried out so that the DLLs may be edited without disturbing the use of the software application or possibly corrupting the software application. However, in other embodiments, the customer may make use of the DLLs directly from the directory where the software application is installed.

Once the DLLs are copied, the customer returns to the user interface and selects from a menu option to import a DLL. In this particular example, a manifest window opens on the customer's computer system. The manifest window includes a button to select a directory to place resources into that have been extracted from the DLL and a button to select the DLL from which the resources will be extracted. Thus, the customer selects the appropriate directory and appropriate DLL, e.g., LanguageBuilder.dll.

It should be noted that the resources extracted from a DLL may be stored differently depending on the embodiment. For instance, in particular embodiments, the resources may be extracted and stored in a file in a directory. While, in other embodiments, the resources may be stored in other permanent (e.g., non-volatile) memory such as database or in temporary (e.g., volatile) memory such as a computer system's RAM. For example, extracting and storing the resources in a database may allow for shared access to the resources in a multi-node environment. Similarly, in particular embodiments, the resources may be extracted and placed in temporary memory (e.g., RAM) to allow for security since the resources cannot be manually manipulated after export as is typically the case with permanent types of storage such as files and databases, for example. Thus, in these particular embodiments, the resource generator module 109 retrieves the resource data from the temporary memory. Those of ordinary skill in the art can envision other types of memories (either permanent or temporary) that may be used for storing the extracted resources in light of this embodiment. However, for purposes of this disclosure, the resources extracted from the DLL are placed in one or more files in the directory identified by the customer.

In this particular embodiment, the user interface is configured to allow the customer to identify the language to which the resources are to be translated. Therefore, in the example, the customer identifies French and selects the import button on the interface. Turning now to FIG. 2, the resource generator module 109 loads the DLL assembly, shown as Step 201. Next, the resource generator module 109 determines the available resources from the selected DLL assembly, shown as Step 202.

For instance, in one embodiment, the resource generator module 109 makes use of reflection. In general, reflection allows an application to use metadata to discover information about itself and/or other targeted libraries. In particular embodiments, XML files (e.g., .RESX files) are utilized to embed graphical and/or static information into DLLs. In these particular embodiments, to embed the files, the XML files (.RESX) are compiled into binary files with the .resource extension and are placed (linked) in the final DLL. Furthermore, in particular embodiments, the embedded resources are given the namespace name for the DLL project plus the name of the RESX files. Thus, to determine the available resources for the selected DLL, the resource generator module 109 reads the .resource extension files linked in the DLL, including the resources for any satellite assemblies.

For example, in one particular embodiment, the resource generator module 109 reads the assembly manifest once the DLL assembly has been loaded. Generally speaking, an assembly manifest contains all the metadata needed to specify the assembly's version requirements and security identity, and all the metadata needed to define the scope of the assembly and resolve references to resources and classes. The manifest includes a list of the files that make up the assembly. Thus, the resource generator module 109 determines from the assembly manifest what resources files are embedded in the DLL.

Once the resource generator module 109 determines the available resource(s), the module 109 extracts the resources, shown as Step 203. For instance, in one embodiment, the resource generator module 109 uses GetManifestResourceStream( ) along with the full path for the resource to extract the resources to one or more files. Once the data from the resources is in a stream, there are several options for accessing the data depending on the embodiment. For example, in one embodiment, the resource generator module 109 makes use of a resource manager (e.g., ResourceManager/ResxResourceWriter) to output the data from the resources to storage (e.g., one or more files, databases, temporary memory, or combination thereof).

Next, the resource generator module 109 creates a manifest to maintain all of the DLL information, shown as Step 204. More specifically, the resource generator module 109 creates the manifest to persist the original assembly name and to persist all resource file paths (full paths) that were created during the extraction process. Similar to the resources, depending on the embodiment, the manifest may be created and stored in one or more files, databases, temporary memory, or combination thereof. Such a manifest allows control of the editing/compilation of a new DLL formed when the user chooses to export the assembly with edited resources to form a revised version of the DLL.

At this point, the resource generator module 109 in this particular example has created a directory containing resource file(s) and the user has the ability to edit the resource file(s) through the module's interface or, in some instances, outside of the module 109. For instance, in one embodiment, the resource generator module 109 loads the resource(s) into an editor in Step 205 and the module 109 provides an interface screen listing a file path tree structure on the left side of the window. In this particular instance, the interface allows the user to drill down into the various categories (e.g., resources) for the assembly to display the individual strings in each category. Each individual string is provided as a row and the row contains the name of the string, the supported language text (e.g., English), and text field (e.g., cell) that may be edited by the user to provide the appropriate translation (e.g., French) for the string. For example, the assembly (DLL) may include a resource named Campaign.resx that includes a key named ConfirmDelete with an English text associated with the key that reads "Confirm Delete." For this particular key, the user provides the French translation of "Confirmez Effacent" in the appropriate cell on the editor screen. Thus, in this example, the user continues until he or she has provided translation text in the translation cell for each string in the extracted resources for the desired language (e.g., French). After editing all of the cells, the user then saves the transactions by selecting the Save option from the menu provided by the editor.

It should be noted that in particular embodiments, the resource generator module 109 may be configured to provide further capability than just extracting resources from DLLs for editing. For instance, in particular embodiments, the resource generator module 109 may be configured to provide a user the option of editing resources that are not embedded in a DLL. Thus, for these particular embodiments, the user would indicate the location (e.g., directory) containing the resources and the resource generator module 109 loads the resources from the location, shown as Step 205. At this point, the user may edit the resources in a similar fashion as described above.

Further, in particular embodiments, the resource generator module 109 may be configured to allow the user to suspend editing of resources extracted for a particular DLL and to resume editing of the resources at a later time after closing and restarting the module 109. Such capability is provided in these particular embodiments as a result of the manifest constructed at the time the resources were extracted from the DLL. Thus, on startup, the resource generator module 109 provides the user with the option to select a location (e.g., directory) containing resources (similar to the capability described above) that the user had previously extracted from a DLL and had started to edit. The user selects the option and the resource generator module 109 receives an indication to resume editing, shown as Step 206. In response, the resource generator module 109 reads the manifest associated with the resources and the DLL, shown in Step 207, and loads the resources from the location into the editor, shown as Step 205. At this point, the user can continue with editing the resources.

As previously mentioned, once the user has completed editing the resource files, the user selects the Save option from the menu provided in the editor. In turn, the resource generator module 109 saves the edited resource information to the appropriate location, shown as Step 208. At this point, the user may re-compile the DLL to produce a revised DLL and/or a new DLL with the edited resources embedded. Thus, in particular embodiments, upon a successful save of the edited resources, the resource generator module 109 provides the user with the option to compile the assembly to produce the revised DLL, shown as Step 209. For instance, the resource generator module 109 may provide a popup screen in one particular embodiment asking the user whether he or she would like to compile the assembly. If the user indicates no, the resource generator module 109 ends the process and returns to a main menu. At this point, the user may exit the module 109 or select another option such as export resources for another DLL.

If the user indicates yes, the resource generator module 109 responds by reading the edited resources, shown as Step 210, and loads the assembly based on the manifest, shown as Step 211. As noted above, the manifest in the example contains all of the resource file paths (full paths) that were created during the extraction process of the resources from the assembly. Therefore, the resource generator module 109 uses the information on these file paths in order to correctly place the resource(s) back into the assembly. Once the resources have been re-inserted into the assembly, the resource generator module 109 compiles the assembly into a DLL, shown as Step 212.

Thus, returning to the example in which the application includes a hub and spoke configuration for providing the application in multiple languages, the resource generator module 109 is configured to compile the assembly to include one or more resource files created in an appropriate file structure to support the hub and spoke configuration. For instance, in one embodiment, the user selects the export option and the resource generator module 109 exports the "new" translated DLL into a directory structure corresponding to the translation language (e.g., French).

The "new" DLL contains the revised resources translated to French. The user may then select another DLL to import that contains resources that need to be edited. That is, for instance, returning to the example, once the user has edited the resources for the LanguageBuilder.dll, the user can follow the same process described above for editing the resources for the CulturalSupport.dll. Since the application is setup with a hub and spoke configuration, once the user has completed editing all the required DLLs and the "new" DLLs have been exported to the directory structure corresponding to French, the user can then copy the French directory structure with the "new" DLLs that support French into the corresponding directory for the original software application that supports the hub and spoke configuration. Accordingly, upon a user of the software application identifying the desired language of French and the software application being started, the application utilizes the "new" DLLs and the language in the application is now French.

Figure 3:
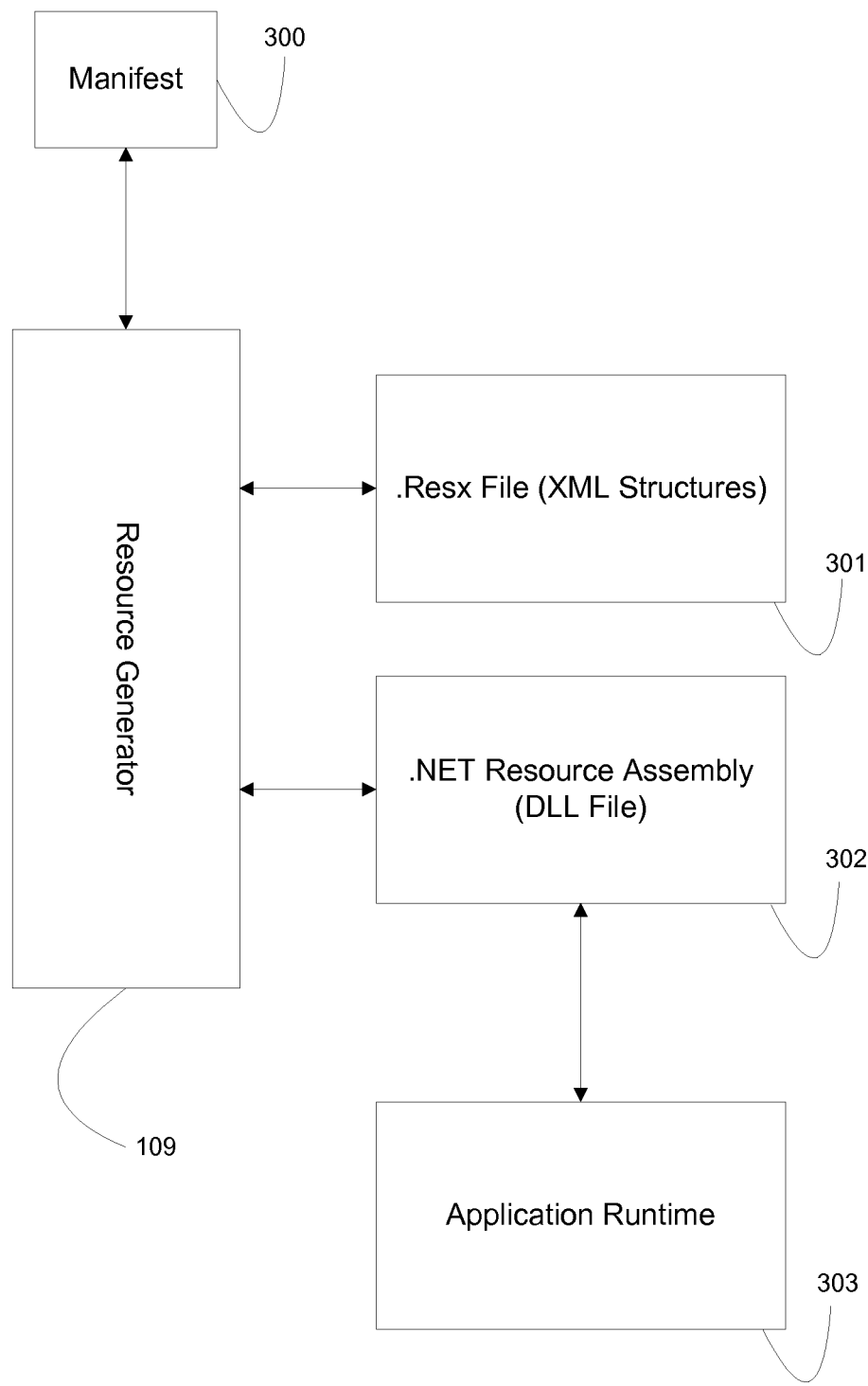
FIG. 3 is an exemplary schematic diagram of various components involved in an embodiment of the present invention.

Turning now to FIG. 3, the diagram provides a look at some of the components involved in editing embedded resources within a DLL according to an embodiment of the invention. Shown in the diagram is the DLL file assembly 302 associated from the application runtime 303 that is loaded by the resource generator module 109. In turn, the resource generator module 109 extracts the data for appropriate resources from the assembly and places the data into one or more .resx files 301 so that the data may be edited. In addition, in this particular embodiment, the resource generator module 109 creates a manifest 300 to record the file paths for the resources extracted from the DLL file 302. At this point, the data for the resources can be edited via the .resx files 301.

Once the data in the .resx files 301 have been edited, the resource generator module 109 imports the edited resource data back into the assembly. To accomplish this task, the resource generator module 109 for this particular embodiment makes use of the file paths stored in the manifest 300. As previously explained, at this point, the resource generator module 109 can re-compile the assembly with the edited resource data into a revised DLL file 302 that can be placed back with the application runtime 303 to be used upon startup.

Examples of Exemplary Editor Interfaces

Figure 4:
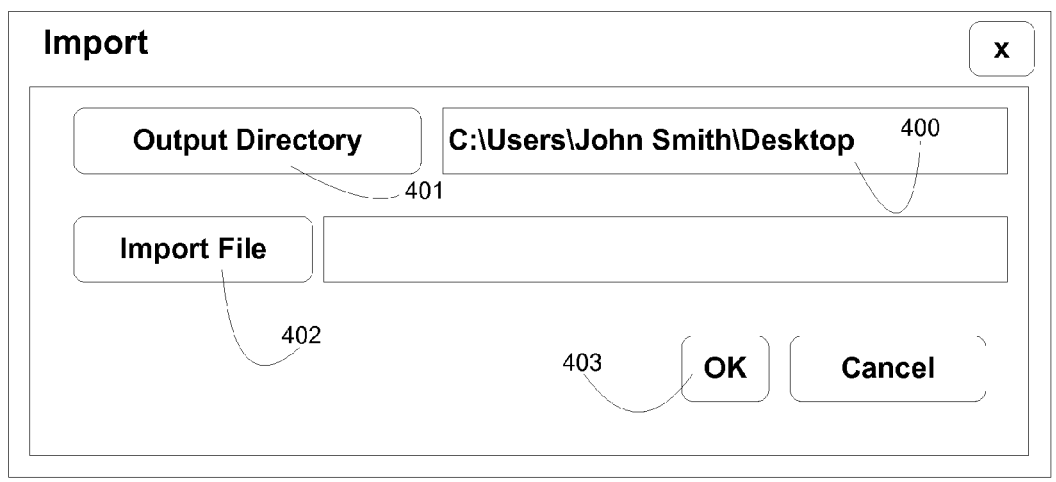
FIG. 4 is an illustration of an editor interface in accordance with an embodiment of the present invention.
Figure 5:
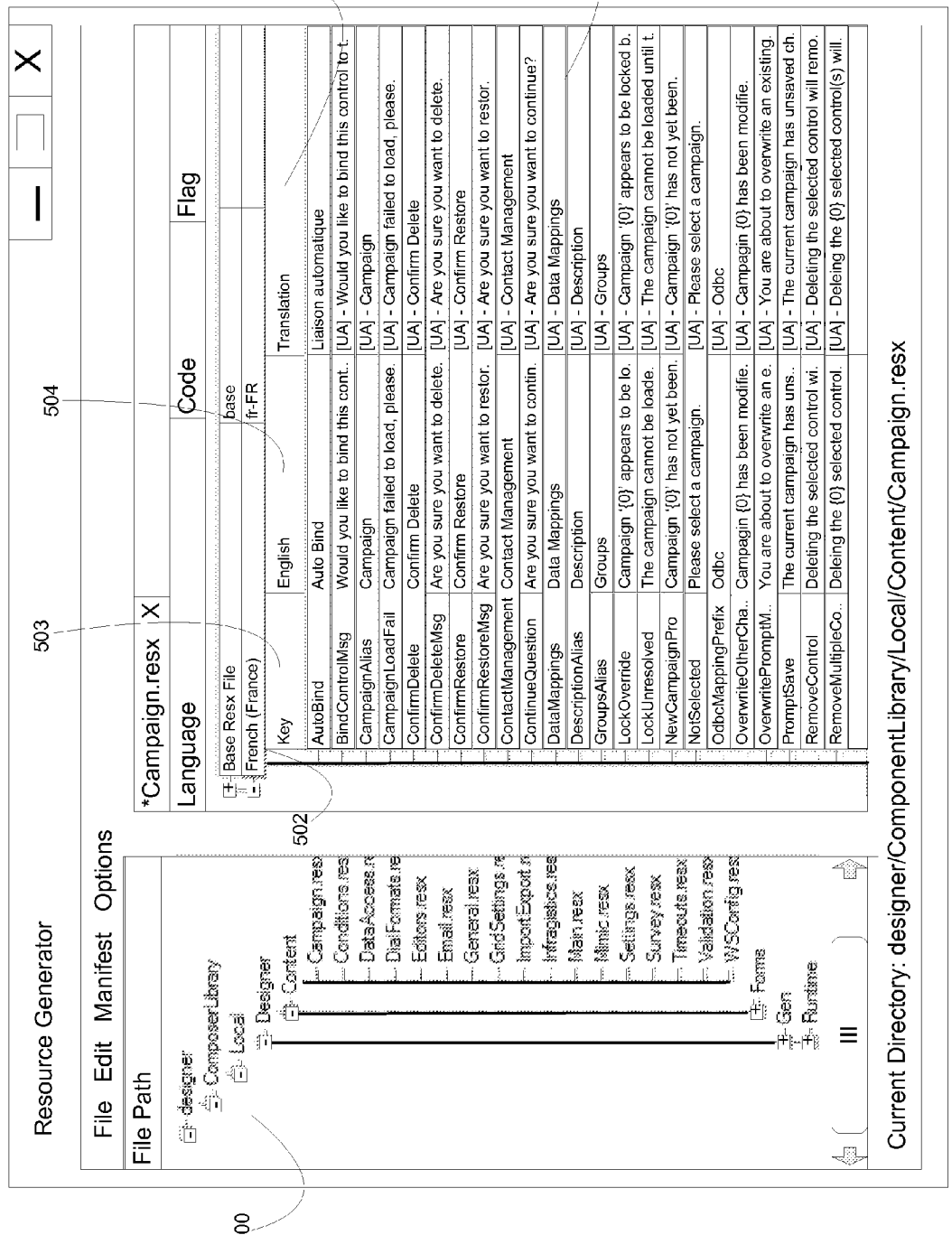
FIG. 5 is an illustration of a second editor interface in accordance with an embodiment of the present invention.

FIGS. 4 and 5 provide examples of editor interfaces that may be used to practice various aspects of the invention. Turning first to FIG. 4, an embodiment of an interface is provided in the figure that may be used to import the DLL assembly and to extract the data for the resources embedded in the DLL. As shown, the user selects an output directory 400 to place the edited resource files. In general, the directory 400 should be different than the directory the software application is housed in for corruption and security purposes. In addition, the directory 400 should be in a place that the user can easily locate. For instance, in FIG. 4, the user (e.g., John Smith) has indicated the edited resource files should be placed on his desktop. For this particular embodiment of the interface, a button 401 is provided to allow the user to navigate to the appropriate directory. Further, the user selects a DLL file to import. For the particular embodiment shown in FIG. 4, the user is provided with a button 402 so that he or she may navigate to the location of the DLL file. Once the two pieces of information have been selected, the user selects the "OK" button 403 to proceed.

FIG. 5 provides an example of an interface once the resource data has been extracted from the DLL into files and the files have been read by the editor. For this particular embodiment, the file path tree structure 500 located on the left side of the interface may be manipulated by clicking on the plus symbols (+) to drill down in the various categories to the individual strings in each category (e.g., each resource), that is, until the user can see all of the strings 501 on the right side of the interface under the translation language name French 502.

In this particular embodiment, each row contains one string that includes the name of the string in the Key column 503, the original English text in the English column 504, and the translated text in the Translation column 505. For this embodiment, the Translation column 505 is the only column that can be edited by the user. Each translation defaults to the English text string proceeded by "[UA]" before the French translation is provided by the user.

For each string in a particular resource file (e.g., Campaign.resx), the user edits the value in the Translation cell to the translated text in the desired language (e.g., French). After editing all of the cells, the user saves the transaction by selecting the menu option File→Save All. Once the user has provided the translated text for all of the resource files, the user may select the menu option Manifest→Export to export the revised DLL with the translation to the directory 400 previously identified.

For instance, in particular embodiments, the revised DLL is exported to a directory previously identified by the user and to a directory structure that supports a hub and spoke configuration of the application. For example, the revised DLL is exported to directory named fr-FR. The user then copies this directory containing the revised DLL into the install directory for the application to provide a satellite assembly file for French.

In one embodiment, upon startup of the application, the .NET runtime looks for a possible satellite assembly file. In one embodiment, the file the .NET runtime looks for depends on the user interface language of the operating system on the machine on which the application is running. If the machine (e.g., computer server) has a French operating system, the .NET runtime looks for a satellite assembly file (e.g., DLL) from fr-FR. In another embodiment, the application may be configured so that, upon startup, the .NET runtime looks for the satellite file that matches the default locale of the user. For instance, a user can set the default locale on his or her machine by using the control panel. Thus, if the default locale is set to French, the .NET runtime looks for a satellite assembly file from fr-FR. If such a satellite assembly file is found, the application is started up and the language displayed for the application is French.

Potential Applications

Although embodiments of the above-described invention may be useful in a number of different industries, an example for a particular industry is now provided to help further explain various embodiments of the invention. A "contact center" is an organization that includes individuals (e.g., agents), telecommunication and/or computer system components, and management software solutions for effectively and efficiently handling inbound and/or outbound communications with customers. For example, a cellular provider may have a contact center so that its subscribers can contact the center for service reasons and/or billing reasons and potential subscribers can contact the center to set up new service with the cellular provider. In many instances, the management software solutions that are used to configure, control, and/or monitor various components of the contact center may be purchased from a number of different vendors/developers of the solutions.

For example, returning to the cellular provider's contact center, the contact center may include a number of agents that service different inbound and outbound communications with subscribers. During these communications, the agents may make use of one or more computer interface screens that provide the agents with different information to assist the agents during the communications with the subscribers. For instance, a subscriber may be contacting the center because the subscriber is having trouble setting up his voice mail on his new cellular phone. In this instance, the agent may be providing the subscriber with instructions on setting up his voice mail for the new phone that the agent has gathered and is reading from a screen provided on the agent's computer monitor.

Currently, the cellular provider's call center has agents located in a facility in the United States and who primarily speak English. However, the cellular provider would like to set up a facility of agents in Mexico City to better service the provider's Spanish-speaking subscribers. In addition, the cellular provider would like to make use of the same interface screens used by the agents in the United States facility. However, the controls and text displayed on the current screens used by the United States agents are in English and the new agents in Mexico City primarily speak Spanish. Therefore, a version of the interface screens needs to be modified so that the controls and text displayed on the screens are in Spanish.

For this particular example, the interface screens are provided through an application purchased by the cellular provider from a vendor /developer who has developed the application and associated interfaces using the .Net framework and has embedded resources within DLLs for the application in a hub and spoke configuration in order to provide support for the controls and text displayed on the interfaces in various languages. Under the circumstances, the cellular provider would normally need to ask its vendor/developer of the application to provide a version of the application that supports Spanish. However, in this instance, the vendor/developer has provided the cellular provider with a tool configured to perform various aspects of the current invention that allow the cellular provider to edit the embedded resources to change the controls and text displayed on the screens to Spanish without the vendor/developer having to develop a new version of the application that supports Spanish. Thus, the cellular provider makes use of the tool and changes the controls and text displayed on the screens to Spanish. As a result, the cellular developer can now make use of the applications in its Mexico City facility.

It should be noted that in some embodiments, the modifications may involve changing the controls and text based simply on locale. For instance, in the example, the cellular provider may instead be opening a new facility for agents in Sidney, Australia. In this new facility, the agents may still be primarily speaking English, and although Australians speak English, they have a dialect that is different than the English dialect spoken in the United States. As a result, the English spoken in Australia may have terms and/or phrases that are different than the English spoken in the United States. For example, a trunk of a car, as commonly referred to in the United States, is instead commonly referred to as a boot in Australia.

Further, as one of ordinary skill in the art will understand the above-described scenario is only one such scenario in which various embodiments of the invention may be applicable and that numerous other scenarios exist. In addition, one of ordinary skill in the art will understand that the application of various embodiments of the invention do not necessarily involve editing embedded resources to change controls and text displayed on application screens from one language to another. Instead, various embodiments of the invention may involve editing embedded resources for any number of reasons. For example, a customer who has purchased an application may wish to edit an embedded resource to include the customer's company logo (e.g., bitmap) in one or more screens of the new application. Thus, one of ordinary skill in the art can envision numerous applications of embodiments of the invention in light of this disclosure.

Finally, as one of ordinary skill in the art will appreciate in light of this disclosure that various embodiments of the invention may be applicable with applications that do not necessarily make use of a hub and spoke configuration. For instance, in particular embodiments, the one or more revised DLLs produced from various aspects of the invention may be used to replace the original DLLs instead of being placed in a hub and spoke configuration as "optional" DLLs instead of the original default DLLs. For these particular applications, for example, the revised DLL may have the same name as the original DLL and may be copied into the directory where the original DLL is located to completely replace the original DLL. Thus, when the application makes use of the DLL, the application now reads the revised version of the DLL in place of the original version of the DLL.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for extracting data from a resource embedded in an original dynamic-link library (DLL) assembly associated with a program application that utilizes the data during execution, the method comprising the steps of:
   extracting the data for the resource by one or more computer processors from the original DLL assembly, the original DLL assembly comprising a necessary DLL structure compatible with the program application;
   storing the data for the resource in memory; and
   creating a manifest in the memory by the one or more computer processors, the manifest comprising a directory path for the data for the resource extracted from the original DLL assembly, the directory path comprising information on placing the data for the resource into the original DLL assembly to construct the necessary DLL structure compatible with the program application.

2. The method of claim 1, wherein the memory comprises one or more files, databases, random access memory, or combination thereof.

3. The method of claim 1, wherein the memory comprises one or more files in an Extensible Markup Language (XML) format.

4. The method of claim 1 further comprising the steps of:
   editing the data in the memory to create replacement data;
   importing the replacement data from the memory by the one or more computer processors into the original DLL assembly based on the directory path for the data for the resource in the manifest; and
   compiling the original DLL assembly, after importing the replacement data, by the one or more computer processors to create a revised DLL assembly comprising the replacement data for the resource, wherein the revised DLL assembly is read by the program application in place of or in addition to the original DLL assembly at runtime without having to rebuild the program application and the replacement data is utilized by the program application in place of or in addition to the original data for the resource.

5. The method of claim 4, wherein the manifest further comprises an original assembly name for the original DLL assembly and the step for compiling the original DLL assembly involves creating the revised DLL assembly by using the original assembly name from the manifest.

6. The method of claim 4, wherein the data from the resource comprises one or more strings in a first language and the step of editing the data in the memory comprises providing a translation in a second language for each of the one or more strings in the first language to create the replacement data.

7. The method of claim 4, wherein the data from the resource comprises one or more graphics and the step of editing the data in the memory comprises editing a graphic of the one or more graphics to create the replacement data.

8. A system for extracting data from a resource embedded in an original dynamic-link library (DLL) assembly associated with a program application that utilizes the data during execution, the system comprising:
   memory; and
   one or more computer processors configured to:
      extract the data for the resource from the original DLL assembly, the original DLL assembly comprising a necessary DLL structure compatible with the program application;
      store the data in the memory; and
      create a manifest comprising a directory path for the data for the resource extracted from the original DLL assembly, the directory path comprising information on placing the data for the resource into the original DLL assembly to construct the necessary DLL structure compatible with the program application.

9. The system of claim 8, wherein the memory comprises one or more files, databases, random access memory, or combination thereof.

10. The system of claim 8, wherein the memory comprises one or more files in an Extensible Markup Language (XML) format.

11. The system of claim 8, wherein the one or more computer processors are configured to:
   facilitate editing the data in the memory to create replacement data;
   import the replacement data from the memory into the original DLL assembly based on the directory path for the data for the resource in the manifest; and
   compile the original DLL assembly, after importing the replacement data, to create a revised DLL assembly comprising the replacement data for the resource, wherein the revised DLL assembly is read by the program application in place of or in addition to the original DLL assembly at runtime without having to rebuild the program application and the replacement data is utilized by the program application in place of or in addition to the original data for the resource.

12. The system of claim 11, wherein the manifest further comprises an original assembly name for the original DLL assembly and compiling the original DLL assembly involves the one or more computer processors creating the revised DLL assembly by using the original assembly name from the manifest.

13. The system of claim 11, wherein the data from the resource comprises one or more strings in a first language and the data is edited in the memory to provide a translation in a second language for each of the one or more strings in the first language to create the replacement data.

14. The system of claim 11, wherein the data from the resource comprises one or more graphics and the data is edited in the memory by editing a graphic of the one or more graphics to create the replacement data.

15. A non-transitory computer-readable medium comprising computer-executable instructions for extracting data from a resource embedded in an original dynamic-link library (DLL) assembly associated with a program application that utilizes the data during execution, that when executed by one or more computer processors cause the one or more computer processors to:
extract the data for the resource from the original DLL assembly, the original DLL assembly comprising a necessary DLL structure compatible with the program application;
store in the data in memory; and
create a manifest comprising a directory path for the data for the resource extracted from the original DLL assembly, the directory path comprising information on placing the data for the resource into the original DLL assembly to construct the necessary DLL structure compatible with the program application.

16. The non-transitory computer-readable medium of claim 15, wherein the memory comprises one or more files, databases, random access memory, or combination thereof.

17. The non-transitory computer-readable medium of claim 15, wherein the memory comprises one or more files in an Extensible Markup Language (XML) format.

18. The non-transitory computer-readable medium of claim 15, wherein the computer-executable instructions, when executed by the one or more computer processors, further cause the one or more computer processors to:
import the replacement data from the memory into the original DLL assembly based on the directory path for the data for the resource in the manifest; and
compile the original DLL assembly, after importing the replacement data, to create a revised DLL assembly comprising the replacement data for the resource, wherein the revised DLL assembly is read by the program application in place of or in addition to the original DLL assembly at runtime without having to rebuild the program application and the replacement data is utilized by the program application in place of or in addition to the original data for the resource.

19. The non-transitory computer-readable medium of claim 18, wherein the computer-executable instructions, when executed by the one or more computer processors, further cause the one or more computer processors to facilitate editing the data in the memory to create the replacement data.

20. The non-transitory computer-readable medium of claim 18, wherein the manifest further comprises an original assembly name for the original DLL assembly and the computer-executable instructions, when executed by the one or more computer processors, further cause the one or more computer processors to compile the original DLL assembly by creating the revised DLL by using the original assembly name from the manifest.

21. The non-transitory computer-readable medium of claim 18, wherein the data from the resource comprises one or more strings in a first language, and the instructions further cause the one or more processors to facilitate editing the data in the memory to provide a translation in a second language for each of the one or more strings in the first language to create the replacement data.

22. The non-transitory computer-readable medium of claim 18, wherein the data from the resource comprises one or more graphics, and the instructions further cause the one or more processors to facilitate editing the data in the memory by editing a graphic of the one or more graphics to create the replacement data.

23. A method for providing a replacement term for a program application that utilizes the replacement term during execution, the method comprising the steps of:
determining an original resource embedded in an original dynamic-link library (DLL) assembly comprising a necessary DLL structure compatible with the program application, the original resource comprising data with an original term;
extracting the data with the original term from the original DLL assembly;
storing the data with the original term in memory;
creating a manifest, the manifest comprising a directory path for the data with the original term extracted from the original DLL assembly, the directory path comprising information on placing the data with the original term into the original DLL assembly to construct the necessary DLL structure compatible with the program application;
editing the data with the original term to create data with the replacement term;
importing the data with the replacement term from the memory into the original DLL assembly based on the directory path for the data with the original term in the manifest; and
compiling the original DLL assembly, after importing the data with the replacement term, to create a satellite DLL assembly, wherein the satellite DLL assembly is read by the program application in place of or in addition to the original DLL assembly at runtime without having to rebuild the program application and the program application utilizes the replacement term in place of the original term.

24. A non-transitory computer-readable medium comprising computer-executable instructions for providing a replacement term for a program application that utilizes the replacement term during execution, that when executed by one or more computer processors cause the one or more computer processors to:
determine an original resource embedded in an original dynamic-link library (DLL) assembly comprising a necessary DLL structure compatible with the program application, the original resource comprising data with an original term;
extract the data with the original term from the original DLL assembly;
store the data with the original term in memory;

create a manifest, the manifest comprising a directory path for the data with the original term extracted from the original DLL assembly, the directory path comprising information on placing the data with the original term into the original DLL assembly to construct the necessary DLL structure compatible with the program application;

import data with the replacement term from the memory into the original DLL assembly based on the directory path for the data with the original term in the manifest, the data with the replacement term comprising the data with the original term having the original term replaced with the replacement term; and compile the original DLL assembly, after importing the data with the replacement term, to create a satellite DLL assembly, wherein the satellite DLL assembly is read by the program application in place of or in addition to the original DLL assembly at runtime without having to rebuild the program application and the program application utilizes the replacement term in place of the original term.

25. The non-transitory computer-readable medium of claim 24, wherein the computer-executable instructions when executed by the one or more computer processors further cause the one or more computer processors to facilitate editing the data with the original term to create the data with the replacement term.

* * * * *